Patented June 14, 1938

2,120,702

UNITED STATES PATENT OFFICE 2,120,702

MANUFACTURE OF CATALYSTS

Vladimir Ipatieff and Raymond E. Schaad, Chicago, Ill., assignors to Universal Oil Products Company, Chicago, Ill., a corporation of Delaware No Drawing. Application August 10, 1936, Serial No. 95,288

4 Claims. (Cl. 23—233)

This invention relates particularly to the manufacture of catalysts useful in accelerating various types of reactions among organic compounds.

In a more specific sense the invention has reference to the manufacture of composite catalytic materials which are employed in granular or powdered form and which may be used to accelerate reactions taking place in liquid phase, vapor phase or mixed liquid-vapor phase.

It is a noteworthy fact in any particular organic reaction involving decomposition of single compounds or the interaction of two or more compounds that many times the reaction velocity constants are of a low order under moderate conditions of temperature and pressure corresponding to a minimum of secondary or side reactions, these latter resulting in the alteration of the primary desired products. For different reactions catalysts of extremely variable character have been found empirically which accelerate the reactions sufficiently so that laboratory processes can be operated upon a commercial scale.

Very few rules have been evolved which enable the prediction of the catalytic activity of any substance in a given organic reaction or the selection of a particular substance to catalyze a particular reaction. Metals, metal oxides, metal salts, various acids and alkalis, and substances of an ordinarily inert character which furnish an absorbent contacting surface have been tried and in different instances have proven effective. The type of catalyst which is manufactured by the process of the present invention is of an essentially acid character.

In one specific embodiment, the present invention comprises the manufacture of catalysts suitable for inducing and/or accelerating reactions among organic compounds by incorporating acids of phosphorus with adsorbent materials preferably of a siliceous character, calcining the primary mixture at a temperature corresponding to extensive dehydration of the acid and hardening of the composite particles, followed by a partial rehydration of the acid by means of water and/or steam at a temperature lower than that employed in the calcining step.

The essential and active ingredient of the solid catalysts which are manufactured by the present process for use in organic reactions is an acid of phosphorus, preferably one in which the phosphorus has a valence of 5. The acid may constitute 80% or more of the catalyst mixture ultimately produced, and in most cases is over 30% by weight thereof. Of the various acids of phosphorus, the orthophosphoric acid ($H_3PO_4$) finds general application in the primary mixtures, due partly to its cheapness and the readiness with which it may be procured although the invention is not restricted to its use but may employ any of the other acids of phosphorus insofar as they are adaptable. It is not intended to infer, however, that the different acids of phosphorus which may be employed will produce catalysts which have identical effects upon any given organic reaction as each of the catalysts produced from different acids and by slightly varied procedure will exert its own characteristic action.

In using orthophosphoric acid as a primary ingredient, different concentrations of the aqueous solution may be employed from approximately 85 to 100% or acid containing some free phosphorous pentoxide may even be used. (By this is meant that the ortho acid may contain a definite percentage of the pyro acid corresponding to the primary phase of dehydration of the ortho acid.) Within these concentration ranges, the acids will be thick liquids of varying viscosity and readily incorporated with absorbent materials. In practice it has been found that pyrophosphoric acid corresponding to the formula $H_4P_2O_7$ is readily incorporated with siliceous and relatively inert carriers at temperatures somewhat above its melting point (61° C.) and that the period of heating which is given to the acid-absorbent mixtures may be changed from that employed with the ortho acid. This point will be developed more in detail in later paragraphs.

The process of the present invention enables the production of highly effective phosphoric acid catalysts for organic reactions in substantially solid granular form, this being accomplished primarily by the alternative use of a number of different absorbent carrying materials which vary somewhat in their absorptive capacity and also in their chemical and physical properties and their influence upon the catalytic effect of the mixtures. A further important feature of the invention consists in the treatment given to the primary mixes which involves heating at temperatures in the neighborhood of 850 to 950° F. to dehydrate the acids past the point corresponding to most effective catalytic action, and then rehydrating by using steam at temperatures of from approximately 450 to 500° F. to bring the acid back to an optimum stage of hydration for greatest catalytic efficiency. The effect of the primary "over-heating" is apparently to increase both the ultimate porosity and the strength of the particles so that they offer greater resistance to disintegrating influences in service.

The materials which may be employed as absorbents or carriers are divisible roughly into two classes. The first class comprises materials of a predominately siliceous character and includes diatomaceous earth, kieselguhr and artificially prepared porous silica such as, for example, Sil-O-Cel. In the case of naturally occurring diatoms it is believed that they sometimes contain minor amounts of highly active aluminum oxide which in some instances seems to contribute to the total catalytic effect of the solid catalyst. This active material is not present in the artificially prepared forms of silica.

The second class of materials which may be employed either alone or in conjunction with the first class (and with certain other optional ingredients to be later described) comprises generally certain members of the class of aluminum silicates and includes such naturally occurring substances as the various fuller's earths and clays such as bentonite, montmorillonite, etc. The class also includes certain artificially prepared aluminum silicates of which the product known as Tonsil is representative, this substance being in a sense a purified aluminum silicate made by treating certain selected clays with sulfuric, hydrochloric or other mineral acid and washing out the reaction products. The naturally occurring substances in this general class are characterized by a high absorptive capacity which is particularly in evidence in making up the present type of phosphoric acid catalyst, and they may also contain traces of active ingredients which may assist in producing the desired catalytic effects. Again each silicate material which may be used alternatively will exert its own specific influence upon the net effectiveness of the catalyst composite which will not necessarily be identical with that of the other members of the class.

The steps in manufacturing high grade catalysts by the present invention have already been briefly outlined but will now be described in more detail. As an example of catalyst manufacture approximately 20% by weight of kieselguhr and 80% by weight of ordinary commercial 90% strength orthophosphoric acid may be mixed at ordinary temperatures in efficient mixing or masticating devices. The pasty material thus produced is then heated gradually with continued stirring at temperatures of from approximately 356 to 428° F. until a solid cake results. This material is then ground out of contact with moist air and sized to produce particles of from approximately 4 to 30 mesh or some smaller range of particles size if desired. The fines and coarser material may be reworked and resubjected to the grinding operation so that ultimately no loss of any consequence occurs.

The sized particles are then subjected to a more intensive heat treatment involving the use of temperatures from approximately 850 to 950° F. At these temperatures it has been found that the dehydration proceeds somewhat past the formation of 100% pyro acid so that a substantial amount of the meta acid $HPO_3$ is formed. This last named acid, however, is not particularly effective in organic catalytic reactions and consequently catalysts of the greatest efficiency result when the "overburned" catalyst particles are rehydrated to a point corresponding to the disappearance of the meta acid. Analyses have shown that best results are generally secured when an acid corresponding most closely to pyrophosphoric acid constitutes the major portion of the final catalyst composite. As a rule steaming at temperatures from 450 to 500° F. for a certain length of time accomplishes the desired rehydration.

When pyrophosphoric acid is employed in the original mixes the temperatures employed in the mixing step are commonly those comprised within the range of from 120 to 180° C. Within this temperature range the acid is sufficiently fluid to enable rapid mixing by mechanical devices, the time necessary for complete mixing to a substantially homogeneous condition being commonly within the range of from 2-5 minutes. From this point on the operations of drying and grinding the cake, sizing the particles, calcining at higher temperatures and rehydrating the acid will be the same as when employing the ortho acid.

Owing to the possibility of varying both the active ingredients and the relatively inert absorbent materials which go to form the catalyst masses, a number of alternatives exists each of which will have its own peculiar catalyzing character which will not be exactly equivalent to masses of different composition.

The type of catalyst produced by the present process is particularly efficient in polymerizing normally gaseous olefins to produce polymers utilizable as good antiknock constituents of motor fuel. In the gases from oil cracking plants there are substantial percentages of 3, 4 and 5 carbon atom hydrocarbons including propylene, butylenes, amylenes and some hexylenes (if the gases are wet) and by the use of the present type of solid phosphoric acid catalysts under properly selected conditions of temperature and pressure such olefins are polymerized principally to dimeric forms. The following table shows the approximate boiling points of the dimers of these olefins.

*Boiling points of olefin dimers*

| | Degrees Fahrenheit |
|---|---|
| Hexylene | 155 |
| Octylene | 255 |
| Decylene | 323 |
| Dodecylene | 417 |

Of the lower boiling and normally gaseous olefins, ethylene is the most resistant to polymerization by catalysts of the present character, but in the presence of its higher homologs it is possible that a certain amount of mixed polymers are formed.

Polymers of higher molecular weight than the di- and trimolecular compounds are generally of too high boiling point to be used in commercial gasolines and the end products of too extensive polymerization are resinous pitchy solids which are entirely unsuitable.

The polymerizing of gaseous olefins with catalysts of the present character may be brought about under numerous combinations of temperature and pressure, though the best results for any given pure olefin or mixture of olefins such as those encountered in the gases from oil cracking plants, will usually correspond to a particular set of conditions. It is a feature of the present type of catalyst that olefin-polymerizing treatments may be conducted at temperatures as high as 250° C. and superatmospheric pressures up to several hundred pounds per square inch without danger of overpolymerization resulting in the formation of heavy tar-like polymers instead of liquids of gasoline boiling range.

In using the catalysts to polymerize gaseous olefins only simple equipment is necessary such as tube or tower in which the catalyst is placed as a filling material. The gases may be pumped up to some given pressure and preheated to a suitable temperature prior to passage through the catalyst mass or the catalyst chamber may be heated externally if desired. A few test runs will usually determine the best conditions of operation. For example, if the temperatures and pressures employed are such that the products exist entirely in vapor phase, the flow of the gases through the catalyst may be upward through filled towers while if liquids are condensed, the best results may be obtained when down flows are used so that liquid does not accumulate on the surface of the catalyst.

Solid phosphoric acid catalysts are characterized by their ability to polymerize olefins to produce relatively low boiling hydrocarbon polymers rather than heavy tars or pitches and by their long life due to the absence of such highly carbonaceous reaction products and also due to lack of oxidizing tendency in the phosphoric acid which constitutes the major portion thereof. In contrast to this it is notable that when employing sulfuric acid as a polymerizing agent, caution is necessary to prevent oxidation and undesirable side reactions such as ester formation and that, when employing metal halides such as aluminum chloride or zinc chloride, the tendency toward the formation of heavy polymers is very pronounced, so that it is not possible to produce more than a limited yield of gasoline without the current production of large quantities of heavier materials. A peculiar advantage resides in catalysts of the present character due to the fact that they are substantially of a non-corrosive character as compared with the decided corrosive action of liquid phosphoric acid and other liquid polymerizing agents. The peculiar structural strength of catalyst masses of the present type has already been noted but may be mentioned again in connection with the general advantages which they possess, this being of special commercial value.

The essential steps in the present process of catalyst manufacture as disclosed above may be applied to the regeneration of spent materials after their surfaces have become coated with carbonaceous residues after a long period of service. In such cases the regeneration process will involve—

1. Treatment with superheated steam at temperatures in the neighborhood of 600–700° F. to remove distillable substances.
2. Heating in air at temperatures within the range of 850–950° F.
3. Rehydrating with steam at a temperature of approximately 475° F.

This procedure is similar to the process of manufacture of fresh catalysts in the last two steps enumerated.

With suitable modifications in the details of operation the present type of catalyst may be employed in a large number of organic reactions, including polymerization of olefins as already mentioned. Typical cases of reactions in which the present type of catalyst may be used are the alkylation of cyclic compounds with olefins, the cyclic compounds including aromatics, polycyclic compounds, naphthenes, aryl amines, and phenols; condensation reactions such as those occurring between ethers and aromatics, alcohols and aromatics, phenols and aldehydes, etc., reactions involving the halogenation of unsaturated organic compounds, isomerization reactions, ester formation and the interaction of carboxylic acids and olefins, etc. The specific procedure for utilizing the present type of catalyst in miscellaneous organic reactions will be determined by the chemical and physical characteristics and the phase of the reacting constituents.

The following example of results obtained in polymerizing olefinic gases when using catalysts of the type comprised within the scope of the invention is characteristic though a number of others are available.

A catalyst was made by mixing 82 parts by weight of 89% commercial phosphoric acid and 18 parts by weight of kieselguhr. The semisolid mass was then heated to approximately 482° F. for a short time after which it was ground and sized to produce particles of from 4 to 10 mesh. The particles thus produced were subjected to a calcining operation for several hours at 900° F. in a current of air, which caused approximately 10% loss in weight. Steam was then passed through the particles until this weight had been regained and the temperature had been held at 475° F. for 4 to 5 hours.

This catalyst was used in a vertical treating tube maintained at a temperature of 450° F. and a gas mixture from the stabilizer of an oil cracking plant (which contained 23% olefins including propylene and higher), was passed downwardly through the catalyst under a pressure of 100 pounds per square inch.

This operation produced 4.5 gallons of gasoline boiling range liquids for each 100 cubic feet of gas mixture treated. The properties of the untreated product are shown in the following table, the figures being the average for a run of several days' duration.

*Properties of gasoline hydrocarbons*

| | |
|---|---|
| Gravity, °A. P. I. | 66.2 |
| Initial boiling point | 105° F. |
| 50% over at | 238° F. |
| 90% over at | 423° F. |
| End boiling point | 445° F. |
| Distillation loss | 3.0% |
| Color, Saybolt | 27 |
| Mg. of gum by copper dish | 35 |
| Octane number—research method | 82 |

A light caustic treatment and a distillation to produce 410° F. end point produce gave a gasoline satisfactory in all respects and stable under storage with the addition of 0.01% of a commercial inhibitor consisting of a selected fraction of hardwood tar.

The character of the invention and the marked commercial value thereof can be seen from a consideration of the preceding specification and the single instance of results given but neither is to be considered as imposing corresponding limitations upon the generally broad scope of the invention.

We claim as our invention:

1. A process for manufacturing catalysts which comprises mixing a phosphoric acid with a siliceous material, calcining the mixture at a temperature sufficient to effect substantial dehydration of the acid, thereby increasing the strength and porosity of the particles of the mixture, and then steaming the mixture at a lower temperature than that of the calcining step to rehydrate the acid at least in part.

2. A process for manufacturing catalysts which comprises mixing a phosphoric acid with a siliceous material, calcining the mixture at a temperature of at least 850° F., and then steaming the mixture at a temperature not substantially above 500° F.

3. A process for manufacturing catalysts which comprises mixing a phosphoric acid with a siliceous material, calcining the mixture at a temperature of from about 850 to 950° F., and then steaming the mixture at a temperature of from about 450 to 500° F.

4. A process for manufacturing catalysts which comprises mixing a phosphoric acid with a solid adsorbent, calcining the mixture at a temperature of at least 850° F., and then steaming the mixture at a temperature not substantially above 500° F.

VLADIMIR IPATIEFF.
RAYMOND E. SCHAAD.